J. W. DAWSON.
AUTOMATIC PRESSURE CONTROLLING VALVE DEVICE.
APPLICATION FILED JUNE 18, 1912.
1,047,506.
Patented Dec. 17, 1912.
3 SHEETS—SHEET 3.
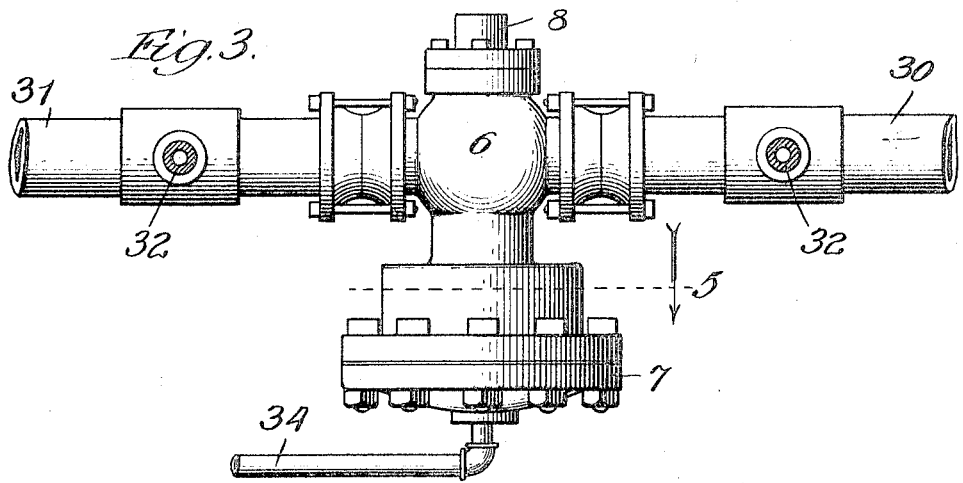
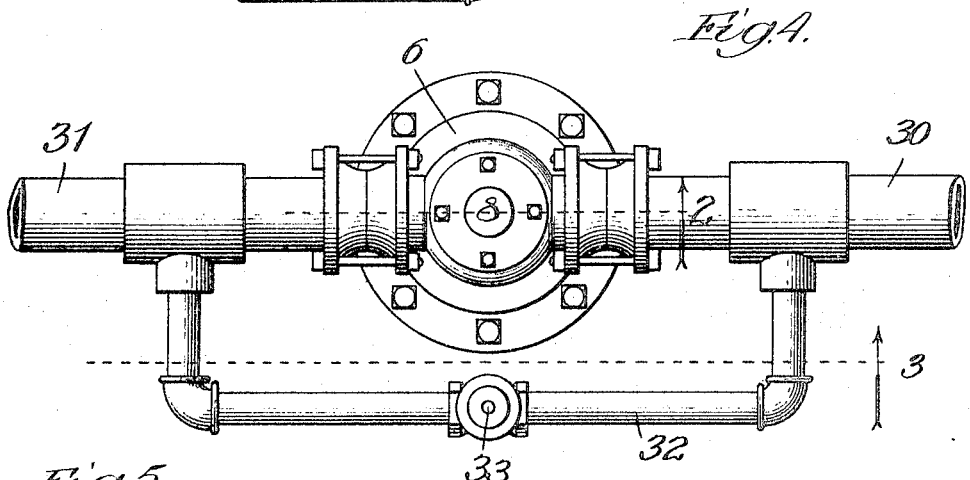
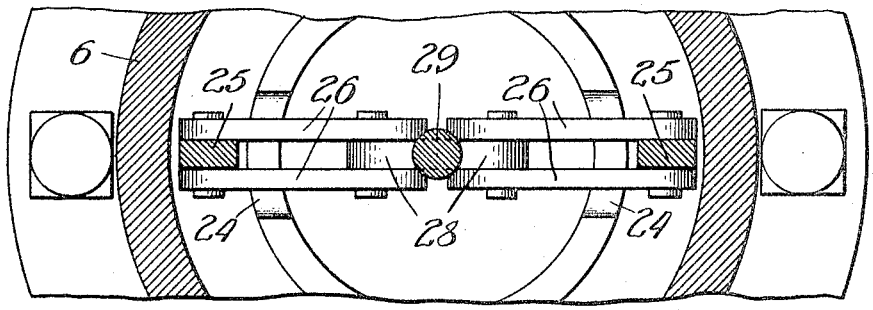
Witnesses:
Inventor,
James W. Dawson,
By Dyrenforth, Lee, Chritton & Wiles,
Attys.

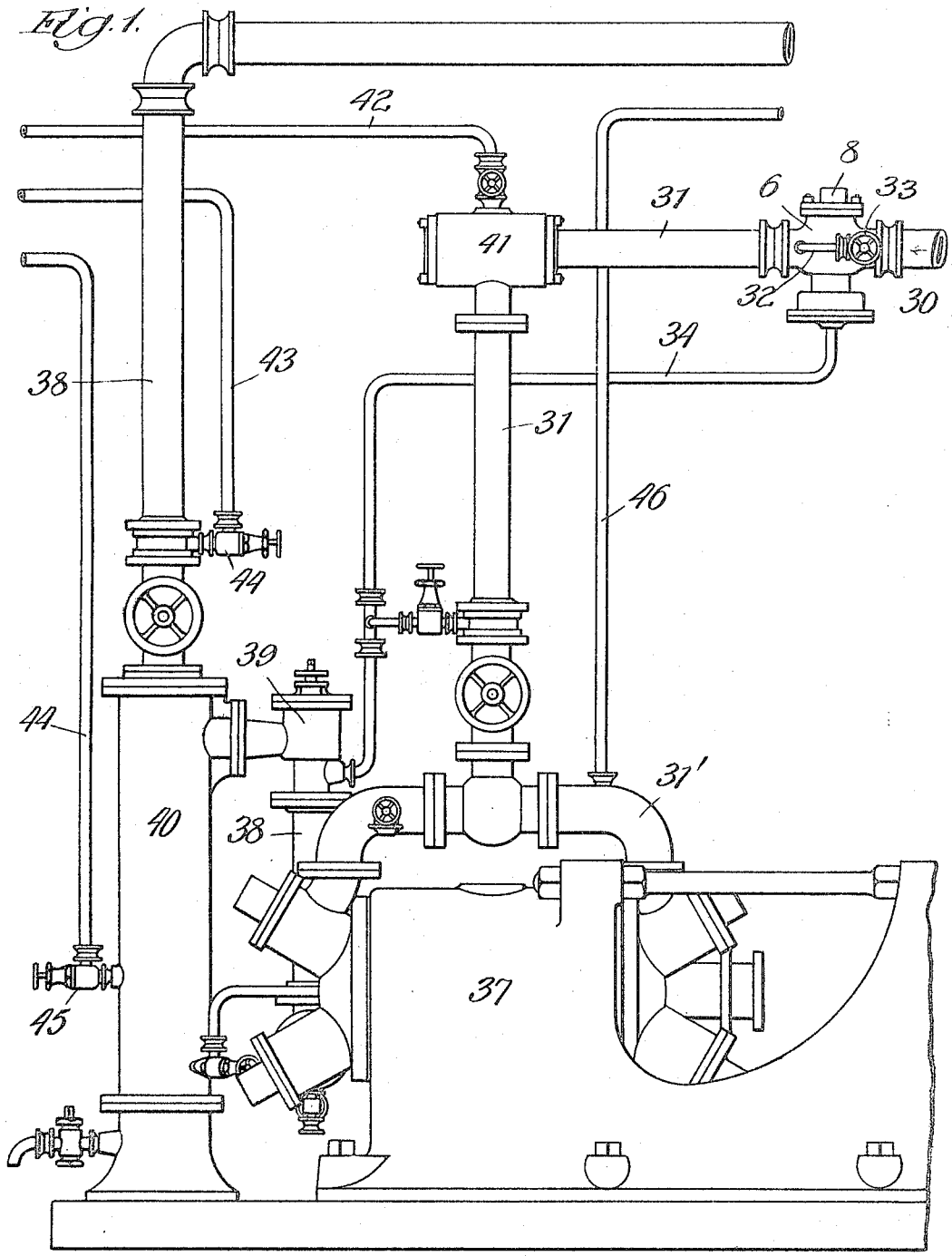

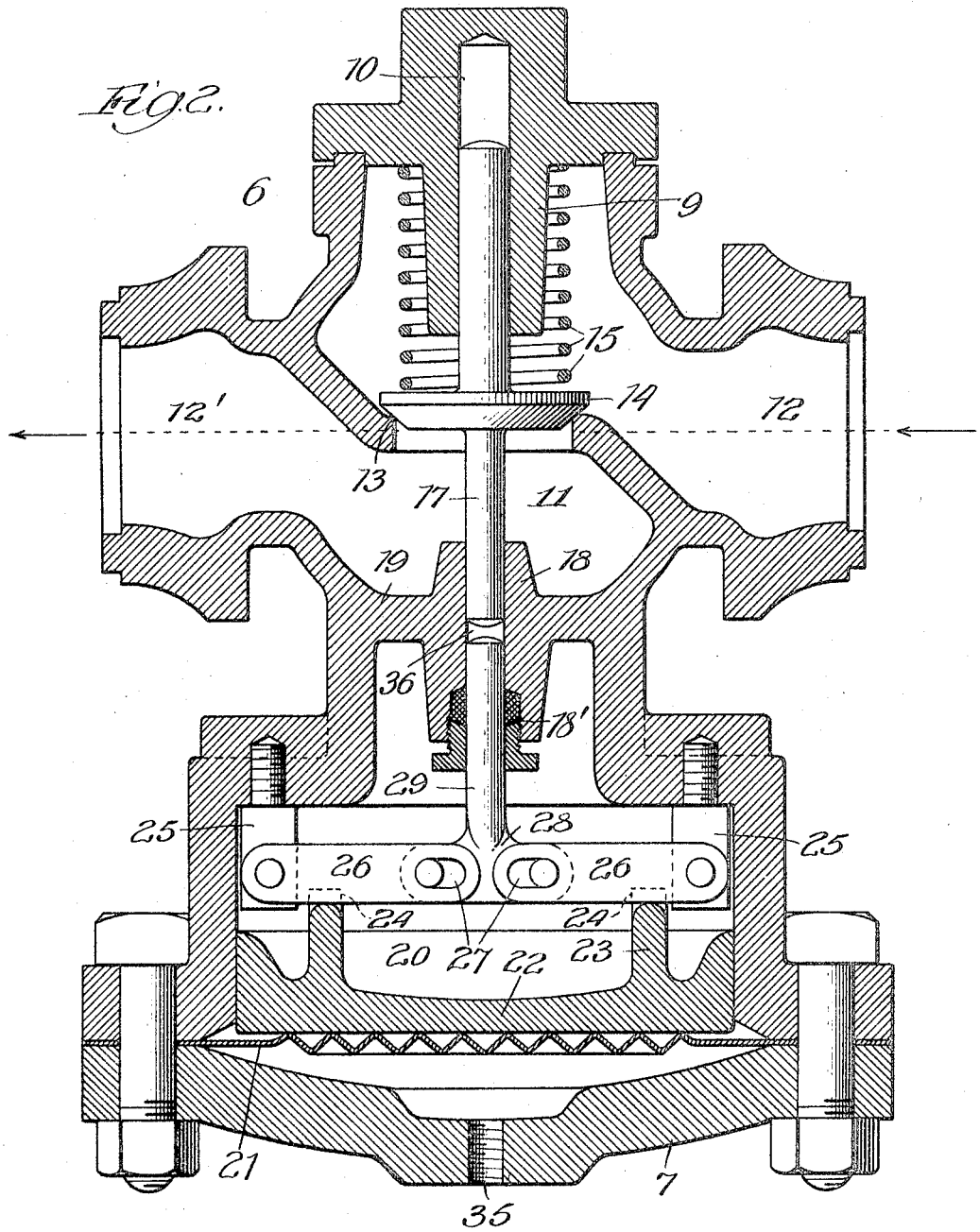

UNITED STATES PATENT OFFICE.

JAMES W. DAWSON, OF CHICAGO, ILLINOIS.

AUTOMATIC PRESSURE-CONTROLLING VALVE DEVICE.

1,047,506.  Specification of Letters Patent.  Patented Dec. 17, 1912.

Application filed June 18, 1912. Serial No. 704,388.

*To all whom it may concern:*

Be it known that I, JAMES W. DAWSON, a citizen of the United States, residing at Chicago, in the county of Cook and State of Illinois, have invented a new and useful Improvement in Automatic Pressure-Controlling Valve Devices, of which the following is a specification.

The primary object of my invention is to provide a construction of valve-device, whereby a valve in the pressure-fluid passage is held normally wide open by the pressure in the system exerted against a flexible diaphragm, the limited extent of movement of which is transmitted to the valve in greatly augmented degree through the medium of suitable mechanism interposed between the valve and diaphragm, and the valve seats automatically to close the passage upon a reduction of the pressure against the diaphragm, as by a break in the system.

In the accompanying drawings, Figure 1 is a view in elevation showing part of a refrigerating system equipped with my improvement; Fig. 2 shows my improved device by a section taken on line 2, Fig. 4, and enlarged; Fig. 3 is a view of the device in sectional elevation, the section being taken on line 3, Fig. 4; Fig. 4 is a plan view of the same, and Fig. 5 is an enlarged broken section on line 5, Fig. 3.

The valve and its operating mechanism are housed in a casing 6 shown as a single casting with a head 7 bolted to its lower, flanged end and a cap 8 on its upper end, having a sleeve-like depending extension 9 containing a central bore 10 for the valve-guiding purpose hereinafter referred to. The passage 11 for the pressure-fluid of the system is formed with the inlet at 12, the outlet at 12¹ and a seat at 13 for the valve 14 controlling communication between the inlet and outlet. A spring 15 about the extension 9 is confined against the valve for seating it; and the valve has a guide-stem 16 extending from its upper side into the bore 10, and a depending valve-stem 17 working in a sleeve 18 in the base-wall 19 of the passage 11, which separates the latter from the lower casing-chamber 20 closed by the head 7. In this chamber is confined about its edge, by the head 7, a flexible metal diaphragm 21, shown to be corrugated though the extent of its movement is so slight as to render corrugations unnecessary. A piston-head 22 in the chamber bears against the inner face of the diaphragm, being carried by the latter, and has formed on its inner face an annular flange 23 provided at diametrically-opposite points with vertically-recessed upright ears 24 for the purpose hereinafter explained. Studs 25, 25 are screwed into the upper wall of the chamber 20 to depend therein at diametrically-opposite points alining with the ears 24, and to each stud are pivotally fastened, to embrace it, a pair of arms forming a lever 26, these arms containing longitudinal slots 27 in their inner ends, which extend nearly to the vertical center of the chamber, where they are pivotally connected with opposite ends of a head 28 on the lower end of a plunger-stem 29 working in the sleeve 18 through a stuffing-box 18¹ therein. The lever-arms traverse and find bearing in the ear-recesses 24.

Pressure-fluid enters the passage 11 through a pipe 30 suitably coupled to the inlet 12 to discharge at the outlet 12¹ through a pipe 31 suitably coupled therewith, these pipes being connected by a by-pass 32 containing a valve 33 between its ends; and a pipe 34 leads, from a point in the system in advance of the valve 14, centrally into the bottom of the chamber 20 (at 35, Fig. 2) beneath the diaphragm. In fact, if my improved valve-device be employed, say, in a water or steam pressure system, the pipe 34 might lead to the point 35 from the discharge-pipe 31, since in the event of a break occurring in that pipe, the consequent loss of pressure through the pipe 34 against the diaphragm would permit the pressure in the pipe 30, supplemented by the spring 15, to seat the valve and thus shut off the flow. In that connection, the stuffing-box 18¹ prevents leakage through the sleeve 18 upon the head 22, which would tend to counteract the pressure against the under side of the diaphragm and thus impair the operation of the valve-device.

Fig. 1 shows my improved device incorporated in a refrigerating machine in general use, for which connection I have more especially adapted it. The illustration represents the compressor at 37, with the discharge-pipe 38 having a check-valve 39 and an oil-trap 40 interposed in it, and the suction-pipes 30, 31 having interposed between them my valve-device with the pipe 31 containing a strainer 41, from which a pipe 42 leads to the gage (not shown), to which also leads a pipe 43 from a valve 43¹ on the discharge-pipe. A pipe 44 leads from a valve 45 on the oil-trap 40 to the oil-separator (not shown), and a "pump-out" pipe 46 leads from a branch 31¹ of the suction-pipe. The pipe 34 of my device leads from the discharge-pipe 38, adjacent to the check-valve 39, thus from the high-pressure side of the machine, to the point 35 in my device. The foregoing reference, by numerals, to the different well-known parts of the refrigerating machine is merely to identify them.

In the operation of a refrigerating plant equipped with my device, with the by-pass valve 33 closed, as it is normally, gas under pressure of, say, about thirty pounds, entering the passage 11 from the inlet 12 through the suction-pipe 30 tends to seat the valve 14, but the pressure of, say, about one hundred pounds, from the discharge-side of the compressor through pipe 34 against the under surface of the diaphragm 21, of relatively-great area, forces it against the head 22 to raise the latter as far as the stops, afforded by the lower ends of the studs 25, will permit. These stops define the limit of movement of the diaphragm, which is very slight—say three thirty-seconds of an inch; so that however great the pressure may be against the diaphragm, by pressing against the under piston-surface it cannot be overstrained. In the rise of the head 22 engagement of the ears 24 with the under sides of the levers 26 near their fulcrums raises the levers toward their inner ends to a much greater extent than that of the diaphragm-movement—say to the extent of seven-eighths of an inch; anyway, sufficiently to fully open the valve 14, since the movement of the levers is transmitted to the plunger-stem 29 which, in its rise, encounters the stem 17 and lifts the valve. So long as sufficient pressure remains in the pipe 34 to work the diaphragm, the valve 14 is sustained in its fully-opened position; but the instant any break occurs in the system between my valve-device and the compressor, and particularly by blowing out a compressor-head, which is not an uncommon accident, the pressure in the pipe 34 is released, permitting the piston and levers with the stem 29 to drop and the valve 14 to seat under the force of its spring. The valve thus shuts off the suction-pipe 30 and prevents the loss of gas from the coils of the refrigerating system. A slight clearance is shown at 36 (Fig. 2), between the adjacent ends of the stems 17 and 29, to insure full seating of the valve 14. The by-pass 32 is used, by opening the valve 33 therein, when, as is occasionally done, the refrigerant is pumped out of the coils and there is no pressure in the pipe 30 to raise the valve, which, being then seated, necessitates the passage about it, through the by-pass, from the pipe 30 to the pipe 31.

I realize that considerable variation is possible in the details of construction of my valve-device thus specifically shown and described for embodying my improvement, and I do not intend by illustrating a single, specific or preferred, form to limit my invention thereto; my intention being in the following claims to claim protection for all the novelty there may be in the improved device as broadly as the state of the art will permit.

What I claim as new and desire to secure by Letters Patent is—

1. In an automatic valve-device of the character described, the combination of a casing having a pressure-fluid passage with an inlet and an outlet, a self-closing valve seating in said passage, a chamber in the casing communicating with the pressure-fluid-supply, a diaphragm in said chamber and a solid reciprocating head fitting therein and bearing against and covering substantially the entire effective surface of the diaphragm and having limited movement, and lever-mechanism in said chamber interposed between the valve and piston to be actuated by the diaphragm to increase by its movement that of the valve for unseating it.

2. In an automatic valve-device of the character described, the combination of a casing having a pressure-fluid passage with an inlet and an outlet, a self-closing valve seating in said passage, a chamber in the casing communicating with the pressure-fluid-supply, a diaphragm in said chamber and a solid reciprocating head fitting therein and bearing against and covering substantially the entire effective surface of the diaphragm, stops in said chamber in the path of the head to limit its movement and that of the diaphragm, and lever-mechanism in said chamber interposed between the valve and head to be actuated by the diaphragm to increase by its movement that of the valve for unseating it.

3. In an automatic valve-device of the character described, the combination of a casing having a pressure-fluid passage with an inlet and an outlet, a self-closing valve seating in said passage and provided with a stem, a chamber in the casing communicating with the pressure-fluid-supply, a diaphragm in said chamber and a reciprocating head fitting therein and bearing against and covering substantially the entire effective surface of the diaphragm and having limited movement, levers fulcrumed in said chamber to extend toward each other across the head in advance thereof, and a plunger-stem pivotally connecting at one end the inner ends of said levers and extending at its opposite end to encounter the adjacent end of the valve-stem, for the purpose set forth.

4. In an automatic valve-device of the character described, the combination of a casing having a pressure-fluid passage with an inlet and an outlet, a self-closing valve seating in said passage and provided with a stem, a chamber in the casing communicating with the pressure-fluid-supply, diaphragm in said chamber and a solid reciprocating head fitting therein and bearing against and covering substantially the entire effective surface of the diaphragm, stops in said chamber in the path of the head, ears on the inner face of the head, levers fulcrumed at their outer ends to said stops to extend toward each other across said ears, and a plunger-stem pivotally connecting at one end the inner ends of said levers and extending at its opposite end to encounter the adjacent end of the valve-stem, for the purpose set forth.

5. In an automatic valve-device of the character described, the combination of a casing having an upper transverse pressure-fluid passage with an inlet and an outlet, and a lower chamber with a vertical sleeve in the wall between said passage and chamber, a self-closing valve seating in said passage and provided with a stem working in said sleeve, a diaphragm in said chamber and a solid reciprocating head fitting therein and bearing against and covering substantially the entire effective surface of the diaphragm and having limited movement, levers fulcrumed at their outer ends in said chamber to extend toward each other in the path of the plunger, and a plunger-stem pivotally connecting at one end the inner ends of said levers and working at its opposite end in said sleeve to encounter therein the valve-stem, for the purpose set forth.

6. In an automatic valve-device of the character described, the combination of a casing having an upper cap with a depending sleeve, and a head on its lower end, an upper transverse pressure-fluid passage through the casing having an inlet and an outlet, a self-closing valve seating in said passage and provided with an upper guide-stem in said sleeve and a depending valve-stem, a lower chamber in the casing divided from said passage by a wall containing a vertical sleeve in which the valve-stem works, said chamber communicating with the pressure-fluid-supply, a diaphragm in said chamber and a solid reciprocating head fitting therein and supported on and covering substantially the entire effective surface of the diaphragm, stops in the path of the head for limiting its movement, levers fulcrumed at their outer ends to said stops to extend toward each other in the path of said head, and a plunger-stem pivotally connecting at its lower end the inner ends of said levers and working at its upper end in said vertical sleeve to encounter therein the valve-stem, for the purpose set forth.

JAMES W. DAWSON.

In presence of—
J. G. ANDERSON,
R. A. SCHAEFER.